(12) United States Patent
Negri et al.

(10) Patent No.: US 9,683,143 B2
(45) Date of Patent: Jun. 20, 2017

(54) JOINT FINISHING ADHESIVE

(71) Applicant: United States Gypsum Company, Chicago, IL (US)

(72) Inventors: Robert H. Negri, Lake Villa, IL (US); Donghong Li, Buffalo Grove, IL (US); Rafael Bury, Wheeling, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 14/840,288

(22) Filed: Aug. 31, 2015

(65) Prior Publication Data
US 2016/0186019 A1    Jun. 30, 2016

Related U.S. Application Data

(60) Provisional application No. 62/096,758, filed on Dec. 24, 2014.

(51) Int. Cl.
| | |
|---|---|
| *C09J 129/04* | (2006.01) |
| *C09J 5/00* | (2006.01) |
| *C09J 9/00* | (2006.01) |
| *C09J 11/04* | (2006.01) |
| *C09J 11/08* | (2006.01) |
| *C09J 131/04* | (2006.01) |
| *E04B 2/56* | (2006.01) |

(Continued)

(52) U.S. Cl.
CPC ............. *C09J 129/04* (2013.01); *C04B 26/04* (2013.01); *C04B 26/18* (2013.01); *C09J 5/00* (2013.01); *C09J 9/00* (2013.01); *C09J 11/04* (2013.01); *C09J 11/08* (2013.01); *C09J 131/04* (2013.01); *E04B 2/56* (2013.01); *E04F 13/02* (2013.01); *E04F 13/042* (2013.01); *C04B 2111/00637* (2013.01); *C09J 2405/00* (2013.01); *C09J 2429/00* (2013.01); *C09J 2431/00* (2013.01); *C09J 2433/00* (2013.01)

(58) Field of Classification Search
CPC ... C09J 129/04; C09J 9/00; C09J 11/08; C09J 11/04; C09J 5/00; C09J 131/04; C09J 2429/00; C09J 2431/00; C09J 2433/00; C09J 2405/00; E04F 13/02; E04F 13/042; E04B 2/56; C04B 26/18; C04B 26/04
See application file for complete search history.

(56) References Cited

U.S. PATENT DOCUMENTS 4,061,620 A * 12/1977 Gillern .................... C08G 8/24
428/528
4,791,159 A    12/1988  DuLaney et al.
(Continued)

FOREIGN PATENT DOCUMENTS

EP    0445653 A1    9/1991

*Primary Examiner* — Brent W Herring
(74) *Attorney, Agent, or Firm* — Greer, Burns & Crain, Ltd.; Pradip Sahu; Philip T. Petti

(57) ABSTRACT

Provided is an adhesive composition suitable for fortifying panel joints in construction, the adhesive composition comprising a polymeric binder, filler and thickener, wherein the binder is selected from acrylic acid polymers, acrylic acid copolymers, alkyds, polyurethanes, polyesters, epoxies, and combinations thereof and wherein the viscosity of the composition is the range from 100 to 200 Brabender Units and density is in the range from about 7.5 lbs/gal to about 10 lbs/gal. Methods of using the adhesive composition in wall assembly are provided as well.

9 Claims, 10 Drawing Sheets

(51) Int. Cl.
*E04F 13/02* (2006.01)
*E04F 13/04* (2006.01)
*C04B 26/04* (2006.01)
*C04B 26/18* (2006.01)
*C04B 111/00* (2006.01)

(56) References Cited

U.S. PATENT DOCUMENTS

| | | | | |
|---|---|---|---|---|
| 5,112,400 | A * | 5/1992 | Nae | C04B 26/02 |
| | | | | 106/197.01 |
| 8,815,040 | B1 * | 8/2014 | Sloan | B44C 1/1712 |
| | | | | 156/235 |
| 9,283,793 | B2 * | 3/2016 | Ikeda | G09F 3/10 |
| 2004/0161568 | A1 * | 8/2004 | Truog | B32B 7/06 |
| | | | | 428/40.1 |
| 2006/0160921 | A1 | 7/2006 | Ragone et al. | |
| 2009/0238811 | A1 * | 9/2009 | McDaniel | A61L 2/00 |
| | | | | 424/94.2 |
| 2010/0210745 | A1 * | 8/2010 | McDaniel | C09D 5/008 |
| | | | | 521/55 |
| 2010/0233146 | A1 * | 9/2010 | McDaniel | A01N 63/02 |
| | | | | 424/94.2 |
| 2012/0097194 | A1 * | 4/2012 | McDaniel | A01N 63/02 |
| | | | | 134/26 |
| 2014/0083038 | A1 | 3/2014 | Negri et al. | |
| 2014/0193889 | A1 * | 7/2014 | McDaniel | A61L 2/00 |
| | | | | 435/264 |
| 2014/0234558 | A1 * | 8/2014 | Ikeda | G09F 3/10 |
| | | | | 428/32.5 |
| 2015/0191607 | A1 * | 7/2015 | McDaniel | C09D 5/008 |
| | | | | 424/409 |

* cited by examiner

JOINT FINISHING ADHESIVE

CROSS-REFERENCE TO RELATED PATENT APPLICATIONS

This application claims the benefit of priority from U.S. Provisional Patent Application 62/096,758, filed Dec. 24, 2014, the entire disclosure of which is incorporated herein by reference.

BACKGROUND

This invention relates to construction materials and building construction methods. It provides adhesive formulations suitable for fortifying joints between abutting panels in wall and ceiling assemblies. Methods also provided for using the adhesive formulations with joint seams, joint reinforcement tape, joint reinforcement trim and framing members.

In building construction, different types of claddings are used as panels for forming interior and exterior wall and ceiling surfaces. Typically, the claddings are in the form of boards (also referred to as panels) affixed to framing members such as in balloon framing arrangements known in the art. Examples of claddings include gypsum board faced with paper, fibrous mats (e.g., fiberglass), and the like. These and other types of boards are typically cut to appropriate dimensions and then fastened to framing members, e.g., with screws, nails, or the like to form wall sections formed from multiple boards.

Two side-by-side boards disposed in the same plane will form a joint seam between them on vertical walls and horizontal ceilings. To finish the seam, joint reinforcement tape is embedded in the seam, along with a layer of joint compound under the tape, and multiple coats of joint compound applied over the tape. Some boards meet at an angle such as when forming a corner. Reinforcement bead can be utilized to hide the corner seam and to protect the corner. Reinforcement bead can be directly attached to the board using fasteners, or a layer of joint compound is applied under the trim to adhere the reinforcement bead to the board. The installed reinforcement is then concealed with multiple layers of joint compound applied over the trim. Fasteners used to affix the board to framing members must also be concealed with multiple layers of joint compound applied over them. After the various joint compound applications are dried, the resulting wall surfaces can be sanded and painted to form the desired uniform and aesthetically pleasing appearance.

The level of finishing as described above can vary. For example, with respect to gypsum wallboard, six (6) levels of gypsum board finish are understood in the art, ranging from zero (no treatment at all) to level five (the highest level of finish), as set forth in Gypsum Association document GA-214 and American Society for Testing and Materials ("ASTM") C840. The level of finish generally corresponds with the number of applications of joint compound to seams, trims, and fasteners. Levels three, four, and five are typically used for occupied spaces within buildings. For single family homes, level 4 is the most common level that is implemented. Level five is less frequently used and usually requires application of a skim coat of joint compound across the entire wall surface.

Conventional approaches for finishing wall assemblies as described above have not been fully satisfactory. The materials conventionally used to finish wall assemblies create significant inefficiencies in the process and also require an advanced level of skill to use effectively. For example, existing joint compounds require three separate coats to be applied to fasteners as well as multiple coats applied to flat seams between boards in the same plane and to corner seams. Each coat must separately dry which introduces significant downtime in the construction process, particularly since the other construction trades ordinarily cannot work inside the building while the wall finishing occurs. Each layer of joint compound can require about a day to dry, and it typically can take about a week to install the gypsum board and finish the flat joints, fasteners, and corner trims for a typical new construction of a home of 2,400 square feet of living space (corresponding to about 10,000 square feet of board).

US Patent Publication US-2014-0083038-A1 describes a joint compound and wall assembly in which a joint compound can be applied in one layer only. This system eliminates the need for applying multiple coats of joint compound and decreases the time needed for wall installation.

SUMMARY

This invention provides adhesive compositions useful in assembling walls during construction. In some embodiments, the adhesive composition comprises a polymeric binder, filler and thickener, wherein the binder is selected from acrylic acid polymers, acrylic acid copolymers, alkyds, polyurethanes, polyesters, epoxies, and combinations thereof and wherein the viscosity of the composition is the range from 100 to 200 Brabender Units and density is in the range from about 7.5 lbs/gal to about 10 lbs/gal. At least in some embodiments, the adhesive composition is formulated with a binder is selected from the group consisting of polyvinyl acetate (PVAc), polyvinyl alcohol (PVOH) and a combination of polyvinyl acetate with polyvinyl alcohol. In some embodiments, the amount of the binder is from 10% to 40% by weight on a solids basis of the wet composition.

At least in some embodiments, the adhesive composition comprises a filler selected from the group consisting of gelling clays, delaminating clays and any combination thereof.

In further embodiments, the filler is selected from the group consisting of kaolin clay, attapulgite clay, and any combination thereof.

In some embodiments, the filler is a combination of kaolin clay in the amount from 5% to 15% and attapulgite clay in the amount from 0.5% to 1.5% by weight.

The rheological modifier can be selected from the group consisting of hydrophobically modified ethoxylated urethanes (HEUR), hydrophobically modified alkali-swellable emulsions (HASE), styrene-maleic anhydride terpolymers (SMAT), hydroxyethyl cellulose (HEC), ethylhydroxyethyl cellulose (EHEC), methylhydroxyethyl cellulose (MHEC), carboxymethyl cellulose (CMC), hydroxypropylmethyl cellulose (HPMC), alkyl hydroxypropyl cellulose ethers, hydroxypropyl methyl celluloses, xanthan gums, alginates, carrageenans, gum arabic, gum karaya, gum tragacanth, gum ghatti, guar gum, locust bean gum, tamarind gum, psyllium seed gum, quince seed gum, larch gum, pectin and its derivatives, dextrans, hydroxypropylcelluloses, and any combination thereof.

Some adhesive compositions are prepared with at least one hydroxyethyl cellulose based rheological modifier and at least one polyacrylate based associative thickener.

The adhesive composition may further comprise at least one of the following: a coloring agent, a foaming agent, a defoaming agent, a buffering agent, an anti-sedimentation agent, wetting agent, plasticizer and a dispersant.

One of the embodiments provides the adhesive composition, wherein the binder is a combination Polyvinyl Acetate/Polyvinyl Alcohol in an amount from 10% to 40% by weight, the filler is a combination of attapulgite clay in an amount from 0.5% to 1.5% by weight and kaolin clay in an amount from 5% to 15% by weight, the rheological modifier is in an amount from 0.01% to 5% by weight, and wherein the composition further comprises a thickener in an amount from 0.01% to 5% by weight, a surfactant in an amount from 0.01% to 1% and a defoamer in an amount from 0.01% to 1%.

Further embodiments provide a method for assembling a wall, the method comprising a step of installing at least one framing member; followed by hanging two gypsum boards such as the two gypsum boards abut on at least one side and create a joint seam between the abutting two gypsum boards; coating the joint seam with the adhesive composition, and applying at least one of a joint reinforcement tape and reinforcement trim over the joint seam coated with the adhesive.

In further embodiments of this method, the adhesive composition is also applied to the framing member. In yet further embodiments, can be applied to the back side of a joint reinforcement tape and/or reinforcement trim, which is then placed over and bonded to a joint seam.

DETAILED DESCRIPTION

Figure 1:
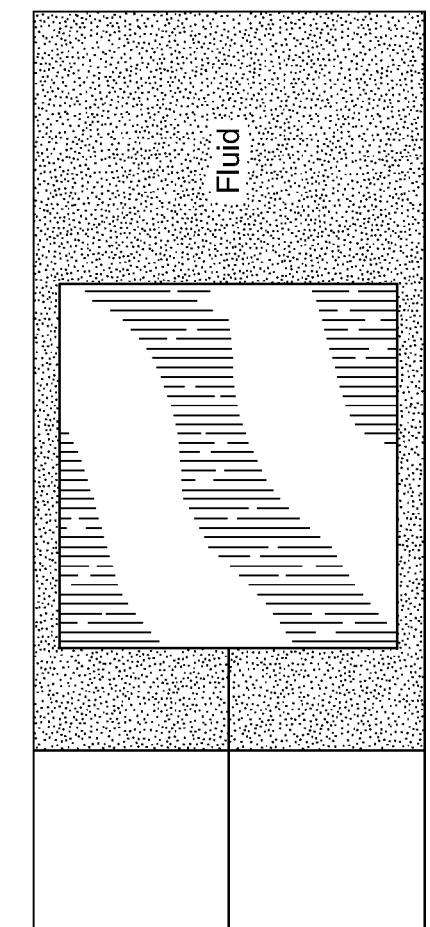
FIG. 1 depicts a schematic of Maxwell's spring and dashpot model.
Figure 1:
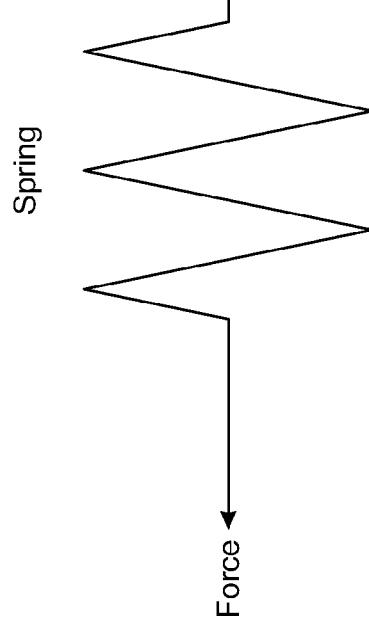

This invention comprises an adhesive composition useful in a joint finishing process to affix and install joint reinforcement tape, trim, and/or other types of material to conceal the joint seam. This adhesive is compatible with a great variety of joint compounds and wall installation systems, including such joint compounds and wall assemblies as provided in US Paten PublicationUS-2014-0083038-A1.

The adhesive composition is formulated to impart unique physical properties designed to provide rheological control as a yield stress fluid that is both a semi-solid and liquid material dependent on the shear stress conditions, a unique wet tack property during installation process, a long open time to execute a practical workable range during installation, yet this adhesive provides a fast drying characteristic after installation.

The adhesive enables efficient and effective installation when delivered to the intended surface using any variety of methods such as brush, roller, spray, or other mechanical apparatus or tool used in the trades, such as an automatic taping tool or manual hopper devices (commonly referred to as "banjo" or hopper coating device).

In accordance with some preferred embodiments of the present invention, a mechanical taping tool apparatus designed to accurately dispense an adhesive that is evenly distributed across the joint reinforcement tape may be employed. Other methods and tools to deliver the adhesive to the wall can be also used.

The adhesive acts to mechanically bond or bind the joint reinforcement tape to abutting gypsum panels over the joint seam to resist physical separation. The adhesive further serves to assist the joint reinforcement tape in providing, in part, a crack resistant joint system by evenly distributing stress more efficiently across the joint seam. The wet applied adhesive converts to a solid film through evaporation of water.

Embodiments include several adhesive base formulations that could be dispensed through tool(s). In preferred embodiments of the present invention, a stable, low yield stress fluid imparts a hysteresis characteristic. The adhesive exhibits a desired strain sweep that imparts the rheological behavior from a shear thinning fluid with rapid recovery to a semi-solid state. The composition of the adhesive is a low solids, high shrinkage, water based latex dispersion.

The adhesive imparts certain other physical properties and provides significant open time and workability of 30 minutes or more to enable practical installation under typical jobsite construction conditions, yet when the adhesive sets into place following the taping operation dries or cures in about 10 minutes or less after installation. A benefit to providing a rapid dry/cure property enables faster completion of a joint finishing system.

The adhesive possesses a resistance softening or re-emulsifying when rewet with water and/or other aqueous based materials.

The adhesive formulation acts as a bonding agent or binding glue and this composition is also suitable for application in areas exposed to higher humidity.

The adhesive can be applied to framing members to minimize the number of fasteners used to hang a board. The adhesive can also be used to facilitate application of joint reinforcement tape and reinforcement trim. In some embodiments, the adhesive is applied on the back side of joint reinforcement tape which is then placed over and bonded to a joint seam of two adjacent boards. In other embodiments, the adhesive is applied on the back side of a reinforcement trim which is then placed over and bonded with the adhesive to a joint seam of two adjacent boards.

The adhesive can be applied with any joint reinforcement tape or reinforcement trim including those that comprise, consist of, or consist essentially of paper face comprising non-swelling synthetic paper facing material and a backing. For example, the facing material can be laminated to a sturdy, rust-resistant material designed to impart superior long term corner angle joint reinforcement that exceeds the minimum performance requirements established in ASTM C1047-10a (Standard Specification for Accessories for Gypsum Wallboard and Gypsum Veneer Base) for crack resistance and chipping, resulting in corner vertex that remains straight during normal building movement and/or displacement and daily wear-and-tear. In some embodiments, the backing comprises metal such as galvanized steel and/or other backing material having the aforesaid desired properties, including, for example, composite laminate structure, layered paper, thermoplastic, thermoset, carbon fiber, polyester, polycarbonate, spun polyolefin, natural or synthetic fiber, woven material, and the like.

In another aspect, the invention provides a method of treating a wallboard assembly of two adjacent boards joined by a seam. The method comprises, consists of, or consists essentially binding a joint tape with the adhesive to a wallboard and applying at least one coat of a joint compound composition over the joint tape.

The adhesive comprises a polymeric binder, filler and thickener. Suitable binders are selected from acrylic acid polymers, acrylic acid copolymers, alkyds, polyurethanes, polyesters, epoxies, and combinations thereof.

Particularly preferred binders include polyvinyl acetate (PVAc), polyvinyl alcohol (PVOH) and a combination of polyvinyl acetate with polyvinyl alcohol.

In some embodiments, the binder generally can be any suitable film-forming resin (or combinations thereof) capable of forming a solid film and binding solid materials to the surface to which the joint compound composition is applied. For example, the binder can be an acrylic acid polymer and/or acrylic acid copolymer in some embodiments. The binder is in the form of an aqueous emulsion in some embodiments, with suitable latex emulsion media including, but not limited to, acrylics, such as, for example, vinyl acrylics and styrenated acrylics. In some embodiments, suitable binder materials include acrylic latex, vinyl-acrylic, vinyl acetate, polyurethane, and/or combinations thereof.

The binder can be included in the adhesive composition in any suitable amount. For example, the binder can be included in an amount from about 5 wt. % to about 100 wt. % by weight (on a solids basis) of the wet composition, such as from about 10 wt. % to about 50 wt. %, from about 10 wt. % to about 40 wt. %, from about 20 wt. % to about 50 wt. %, from about 20 wt. % to about 80 wt. %, from about 30 wt. % to about 70 wt. %, from about 40 wt. % to about 60 wt. %, etc.

Suitable binders include at least one of the following binder or a combination at least two of such binders available from Celanese, Inc.: RESYN 107 (polyvinyl acetate/dextrin), DUR-O-SET E-130 (polyvinyl acetate/polyvinyl alcohol), RESYN SB-321 (polyvinyl acetate/HEC), Tur-COR 3025 (polyvinyl acetate/polyvinyl alcohol). Other suitable binders include SELVOL 09-325 (polyvinyl alcohol) and SELVOL 21-205 (polyvinyl alcohol) available from Sekisui, Inc.

The adhesive comprises at least one filler. Suitable fillers include clay fillers. Suitable clay fillers include gelling clays, delaminating clays and any combination thereof. Suitable gelling clays include attapulgite clay. Suitable delaminating clays include kaolin clay. In some embodiments only a gelling clay is used. In other embodiments only a delaminating clay is used. In further embodiments, a combination of at least one gelling clay and at least one attapulgite clay is used.

The total amount of clay in the adhesive formulation varies. In some embodiments up to about 40 wt. % of clay can be included. In some embodiments, the clay can be present, for example, in an amount of up to about 35 wt. %, up to about 30 wt. %, up to about 25 wt. %, up to about 20 wt. %, up to about 15 wt. %, up to about 10 wt. %, up to about 5 wt. %, or up to about 1 wt. % added based on the weight of the wet composition. Each of the aforementioned endpoints can have a lower limit, e.g., ranging from 1 wt. %, 5 wt. %, 10 wt. %, 15 wt. %, 20 wt. %, 25 wt. %, 30 wt. %, or 35 wt. %, as numerically appropriate.

In some embodiments, the clay is kaolin clay. In other embodiments, the clay is attapulgite clay. In further embodiments, the clay is a combination of kaolin clay and attapulgite clay. The total amount of clay may be in the range 1-40 wt %, 1-30 wt %, or 1-20 wt %. The total amount of kaolin clay may be in the range 5-30 wt %, 5-20 wt %, or 5-15 wt %. The total amount of attapulgite clay may be in the range 1-10 wt %, 1-5 wt %, 1-2.5 wt %, or 0.5-1.5 wt %.

The adhesive formulation further comprises a rheological modifier. Suitable rheological modifiers include, but are not limited to, cellulosic and associative thickeners, including but limited to, hydrophobically modified ethoxylated urethanes (HEUR), hydrophobically modified alkali-swellable emulsions (HASE), and styrene-maleic anhydride terpolymers (SMAT), and/or combinations thereof. Exemplary cellulosic rheological modifiers include, but are not limited to, cellulose ethers such as hydroxyethyl cellulose (HEC), ethylhydroxyethyl cellulose (EHEC), methylhydroxyethyl cellulose (MHEC), carboxymethyl cellulose (CMC), hydroxypropylmethyl cellulose (HPMC), and/or other cellulose ethers having a molecular weight between about 1000 and 500,000 daltons, e.g., alkyl hydroxypropyl cellulose ethers, hydroxypropyl methyl celluloses, as well as xanthan gums, sodium alginates and other salts of alginic acid, carrageenans, gum arabic (mixed salts of arabic acid), gum karaya (an acetylated polysaccharide), gum tragacanth (a complex mixture of acidic polysaccharides), gum ghatti (the calcium and magnesium salt of a complex polysaccharide), guar gum (a straight chain galactomannan) and its derivatives, locust bean gum (a branched galactomannan), tamarind gum, psyllium seed gum, quince seed gum, larch gum, pectin and its derivatives, dextrans, and hydroxypropylcelluloses, or any combination thereof.

The rheological modifier can be included in any suitable amount, e.g., to achieve a desired viscosity. In some embodiments, the rheological modifier is included in an amount from about 0.01% to about 15%, by weight of the wet composition, such as from about 0.01% to about 10%, from about 0.01% to about 5%, from about 0.1% to about 5%, from about 0.1% to about 3%, from about 0.1% to about 2%, or from about 0.1% to about 1%. The joint compound typically comprises from about 0.01 wt. % to about 10 wt. %, about 0.1 wt. % to about 5.0 wt. %, and/or about 0.10 wt. % to about 3.0 wt. % of the cellulosic thickener. An exemplary hydroxyethylcellulose rheological modifier includes NATROSOL® (Ashland, Inc.).

The adhesive composition may further comprise an associative thickener. Such suitable associative thickeners include acidic acrylate copolymers (cross-linked) of ethyl acrylate and methacrylic acid, and acrylic terpolymers (cross-linked) of ethyl acrylate, methacrylic acid, and non-ionic urethane surfactant monomer. The adhesive composition can comprise from about 0.01 wt. % to about 10 wt. %, from about 0.01 wt. % to about 5 wt. %, from about 0.1 wt. % to about 5.0 wt. %, and/or about 0.1 wt. % to about 3 wt. % of the associative thickener. Useful associative thickeners include a hydrophobically modified crosslined polyacrylate powder marketed under the CARBOPOL® trade name (Lubrizol, Inc.).

In some embodiments, the adhesive composition comprises at least one hydroxyethyl cellulose based rheological modifier and at least one polyacrylate based associative thickener. In some embodiments, the adhesive composition comprises at least one hydroxyethyl cellulose based rheological modifier in the amount from 0.01 to 20 wt %, and at least one polyacrylate based associative thickener in the amount from 0.01 to 20 wt %.

The adhesive composition also comprises at least one surfactant. For example, in some embodiments, the surfactant can be a surfactant having a hydrophilic-lipophilic balance (HLB) from about 3 to about 20, such as from about 4 to about 15 or from about 5 to about 10. The surfactant can be present in any suitable amount, such as from about 0.001% to about 15% by weight of the wet composition, such as from about 0.001% to about 10%, from about 0.001% to about 5%, or from about 0.01% to about 0.5%.

The adhesive composition may further comprise at least one dispersant. Suitable dispersants include amine based dispersants such as a multifunctional amine marketed under the AMP® trade name (Angus, Inc.).

The adhesive composition may further comprise at least one humectant. Any suitable humectants can be included, such as, for example, sorbitol derivatives, polyhydric alcohols, including but not limited to glycols such as ethylene glycol, diethylene glycol (DEG), triethylene glycol, propylene glycol, di-propylene glycol, and/or tri-propylene glycol, glycerol or any combination thereof. If included, the humectants can be included in an amount from about 0.001% to about 15% by weight of the wet composition, such as from about 0.001% to about 10%, from about 0.01% to about 5%, or from about 0.001% to about 3%.

The adhesive composition has a pH in the range from about 7.0 to about 12. In some embodiments, the adhesive composition has a pH in the range from about 8.0 to about 12. In some embodiments, the adhesive composition has a pH in the range from about 9.0 to about 12.

A variety of basic materials may be used in the adhesive composition to adjust the pH as needed. Such basic compounds include, but are not limited to ammonia, caustic soda (sodium hydroxide), tri-ethylamine (TEA), and 2-amino-2-methyl-1 propanol (AMP). In various embodiments, the adhesive composition comprises about 0.001 wt. % to about 10 wt. %, about 0.01 wt. % to about 0.5 wt. %, and/or about 0.01 wt. % to about 0.50 wt. % of the alkaline/basic material.

In some embodiments, the adhesive composition further comprises a biocide in any suitable amount, e.g., from about 0% to about 5% by weight of the wet composition, such as from about 0.05% to about 2%, from about 0.1% to about 1.5%, from about 0.1% to about 1%, or from about 0.1% to about 4%. If included, in some embodiments of the adhesive composition, the biocide comprises a bactericide and/or a fungicide. An illustrative useful bactericide is marketed under the MERGAL 174 ® trade name (TROY Chemical Corporation). An illustrative useful fungicide is marketed under the FUNGITROL® trade name (International Specialty Products, New Jersey), or any combination thereof.

The adhesive composition may further comprise at least one of the following: a coloring agent, a foaming agent, a defoaming agent, a buffering agent, an anti-sedimentation agent, wetting agent, plasticizer and a dispersant.

The adhesive composition is formulated to have a viscosity when wet from about 100 Brabender units (BU) to about 700 BU, such as from about 100 BU to about 600 BU, about 100 BU to about 500 BU, about 100 BU to about 400 BU, about 100 BU to about 300 BU, about 100 BU to about 200 BU, about 130 BU to about 700 BU, about 130 BU to about 600 BU, about 130 BU to about 500 BU, about 130 BU to about 400 BU, about 130 BU to about 300 BU, about 130 BU to about 200 BU, about 150 BU to about 700 BU, about 150 BU to about 600 BU, about 150 BU to about 500 BU, about 150 BU to about 400 BU, about 150 BU to about 300 BU, or about 150 BU to about 200 BU. The viscosity is measured according to ASTM C474-05, Section 5 using a CW Brabender viscometer with a Type-A Pin, sample cup size of ½ pint with a 250 cm-gm cartridge Brabender Torque-Head and an RPM of 75.

The adhesive composition is formulated to have a density when wet from about 2 lbs/gal to about 20 lbs/gal, such as from about 2 lbs/gal to about 17 lbs/gal, from about 2 lbs/gal to about 15 lbs/gal, from about 2 lbs/gal to about 10 lbs/gal, from about 2 lbs/gal to about 7.5 lbs/gal, from about 5 lbs/gal to about 20 lbs/gal, from about 5 lbs/gal to about 15 lbs/gal, from about 5 lbs/gal to about 10 lbs/gal, or from about 7.5 lbs/gal to about 10 lbs/gal.

The adhesive composition provides many advantages such as it can flow through an automatic taping tool and it contributes only minimally to the dry film thickness. There is no swelling or lifting upon re-wet or when exposed to cyclic humid conditions. There is a sufficient open time for repositioning. The adhesive composition does not dry on tools and it is easy to clean up with water. The adhesive composition is compatible with joint compounds and it does not negatively affect the drying time and gloss/sheen of regular primer/finish coatings.

In some embodiments, the adhesive composition is formulated with at least the following ingredients as provided below.

TABLE 1

Adhesive Composition

| Ingredient | Wt % |
| --- | --- |
| Polyvinyl Acetate/Polyvinyl Alcohol Binder | 10-40 |
| Attapulgite Clay Filler | 0.5-1.5 |
| Kaolin Clay Filler | 5-15 |
| Rheological Modifier | 0.01-5 |
| Thickener | 0.01-5 |
| Surfactant | 0.01-1 |
| Defoamer | 0.01-1 |

The adhesive composition of Table 1 is formulated with water to achieve the density in the range from about 7.5 lbs/gal to about 10 lbs/gal and viscosity in the range from 100-200 Brabender Units.

Additional components, include but are not limited to, a coloring agent, dispersant, humectant and a biocide are added. The pH of the adhesive composition is adjusted to be in the range 7-10.

The following seven adhesive formulations were prepared as described below in Table 2.

TABLE 2

Joint Finishing Adhesive Compositions (C1-C7)

| Ingredient | C1 (lbs) | C2 (lbs) | C3 (lbs) | C4 (lbs) | C5 (lbs) | C6 (lbs) | C7 (lbs) |
| --- | --- | --- | --- | --- | --- | --- | --- |
| Water | 500 | 500 | 500 | 500 | 500 | 500 | 500 |
| Clay | 100 | 100 | 100 | 100 | 100 | 100 | 100 |
| Surfactant | 0.6 | 0.6 | 0.6 | 0.6 | 0.6 | 0.6 | 0.6 |
| Rheological Modifier | 25 | 25 | 25 | 25 | 25 | 25 | 25 |
| Dispersant | 1.5 | 1.5 | 1.5 | 1.5 | 1.5 | 1.5 | 1.5 |
| PVAc/Dextrin Binder | 200 | | | | | | |
| PVOH Binder 1 | | 200 | | | | | |
| PVOH binder 2 | | | 200 | | | | |
| PVAc/PVOH Binder | | | | 200 | | | |
| PVAc/HEC | | | | | 200 | | |
| PVOH binder 3 | | | | | | 200 | |
| PVAc/PVOH binder | | | | | | | 200 |

Each of the seven formulations (C1 through C7) were compared in a paper bonding test. In this test, each adhesive sample was applied on a piece of a wallboard, and joint paper tape was applied over it, followed by the application of a joint compound over the tape. The samples were allowed to dry overnight. The bonding strength of each of the adhesive formulations was evaluated by pulling out the bonded joint paper tape from the wallboard.

It was unexpectedly discovered that formulations C1, C4 and C7 perform the best, while formulation 3 has failed the test.

Rheological characterization of the adhesive composition can be achieved by conducting various tests such as shear rate ramp, shear rate jump, strain sweep and frequency sweep. These tests were employed to characterize the rheological properties of the present joint finishing adhesive compositions.

As can be appreciated from FIGS. 2-6, the present adhesive composition formulated in accordance with Table 1 (shown as IC in FIGS. 2-6) has a relatively fast response time to sudden changes in shear rate as well as has a unique combination of a high storage modulus and a low loss modulus.

Figure 2:
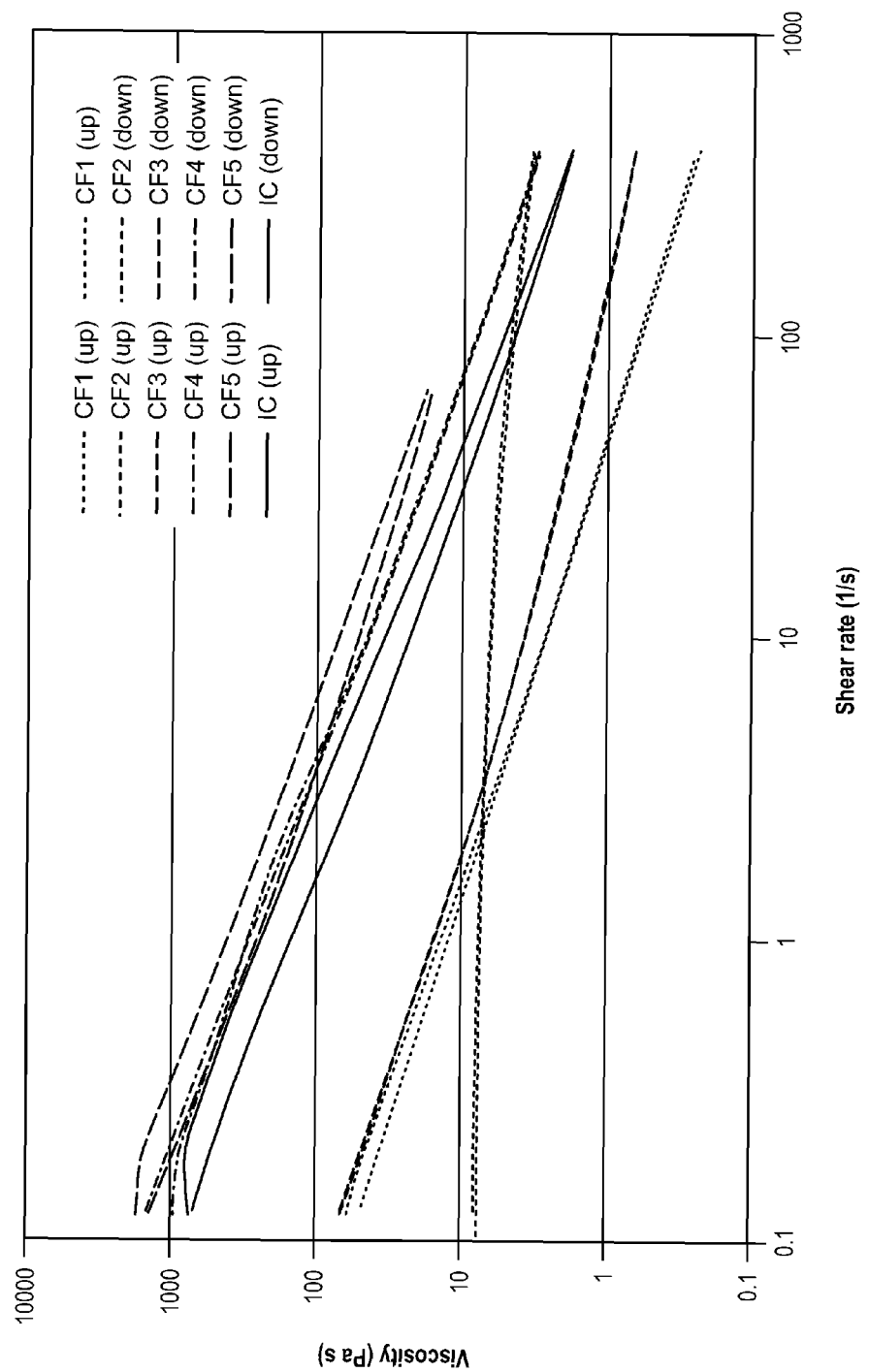
FIG. 2 is a graph of viscosity rates during shear rate ramp (left) and shear rate jump (right).

As shown in FIG. 2, the controlled shear rate ramping test illustrates that the adhesive composition IC recovers its full viscosity much more rapidly than the other two highly viscous adhesives used in test for a comparative purpose.

Figure 3A:
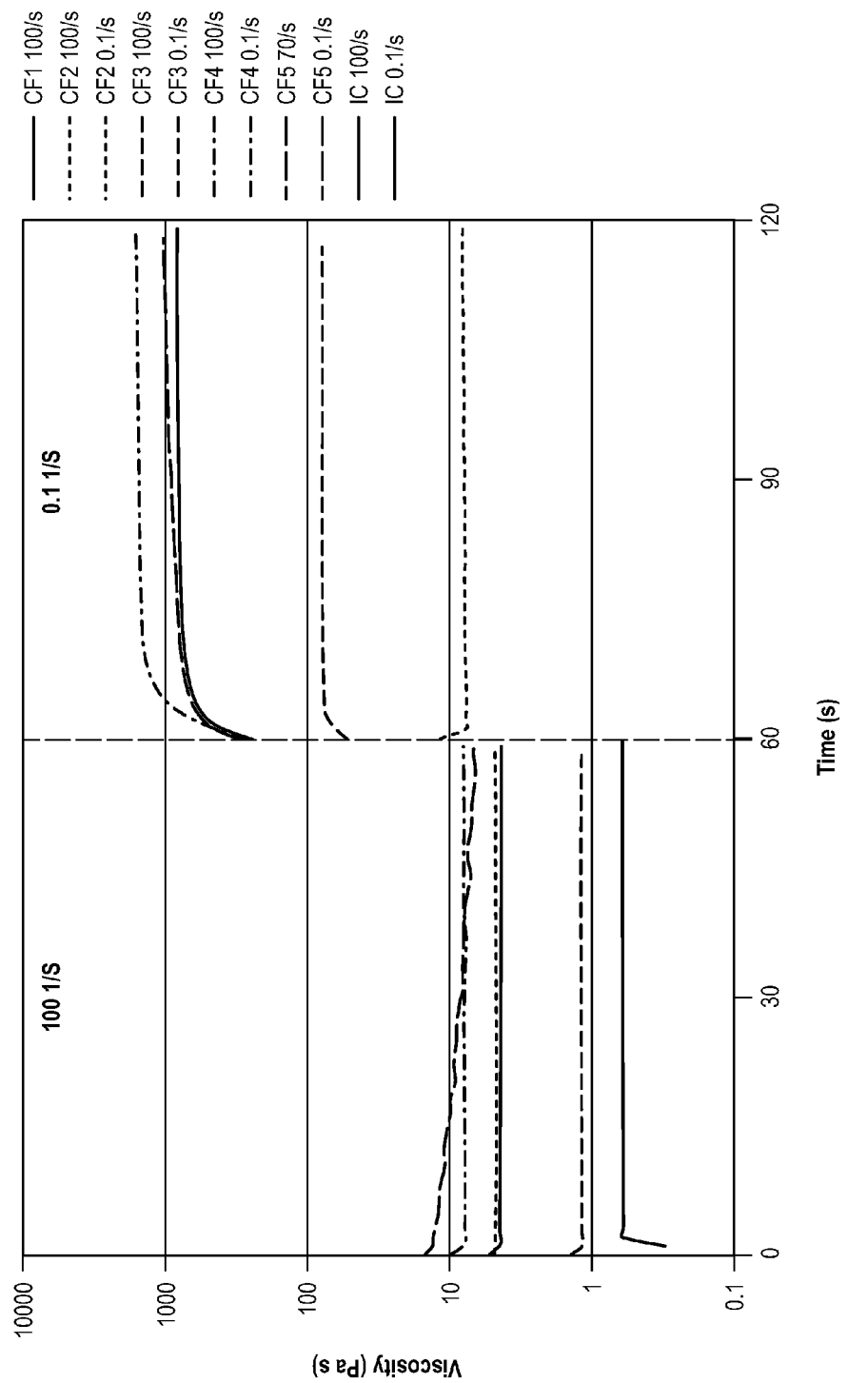
FIG. 3A is a plot of storage and loss moduli in a strain sweep test.
Figure 3B:
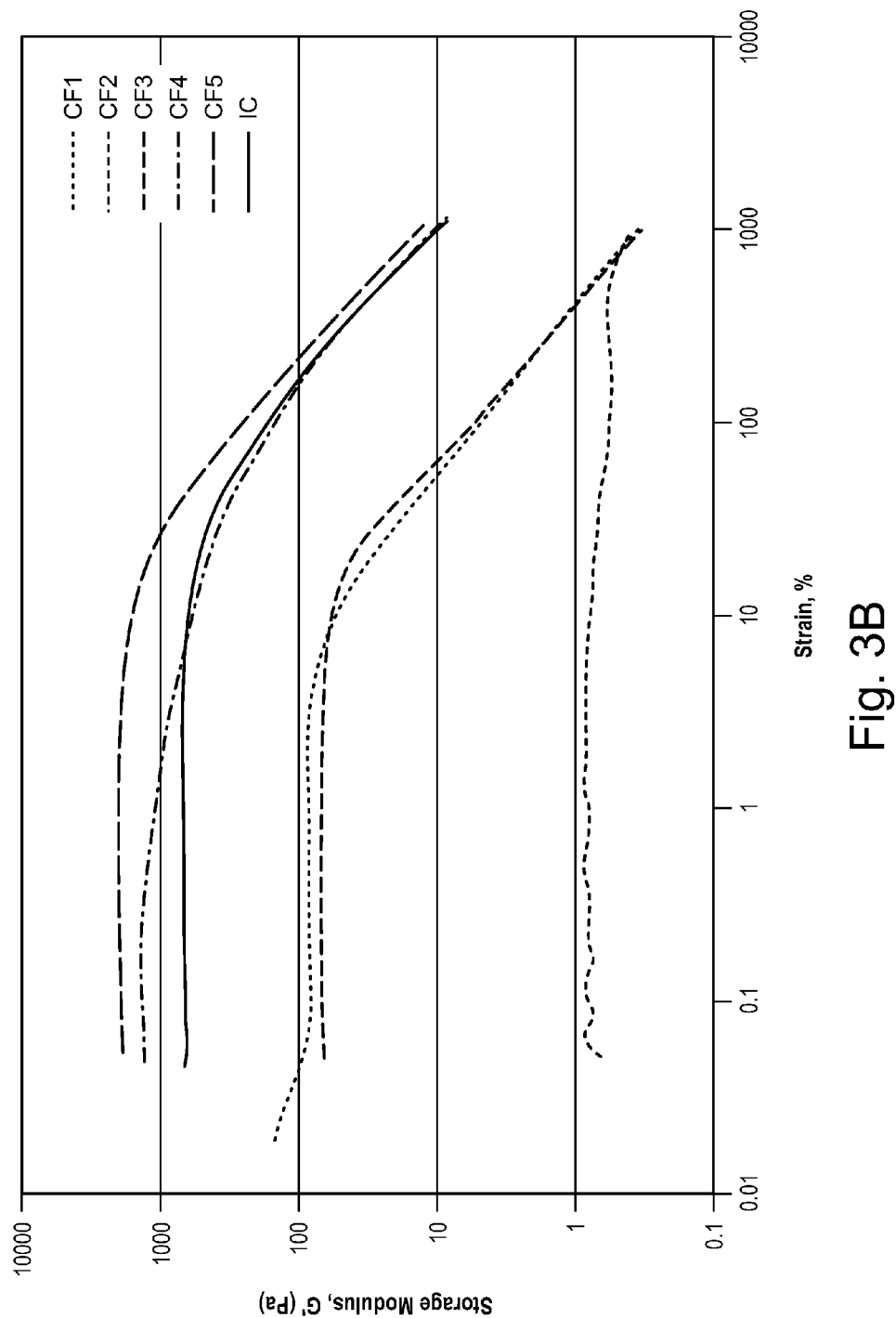
FIGS. 3B-3E are plots of storage and loss moduli are plots of storage and loss modulus during a frequency sweep test.
Figure 3C:
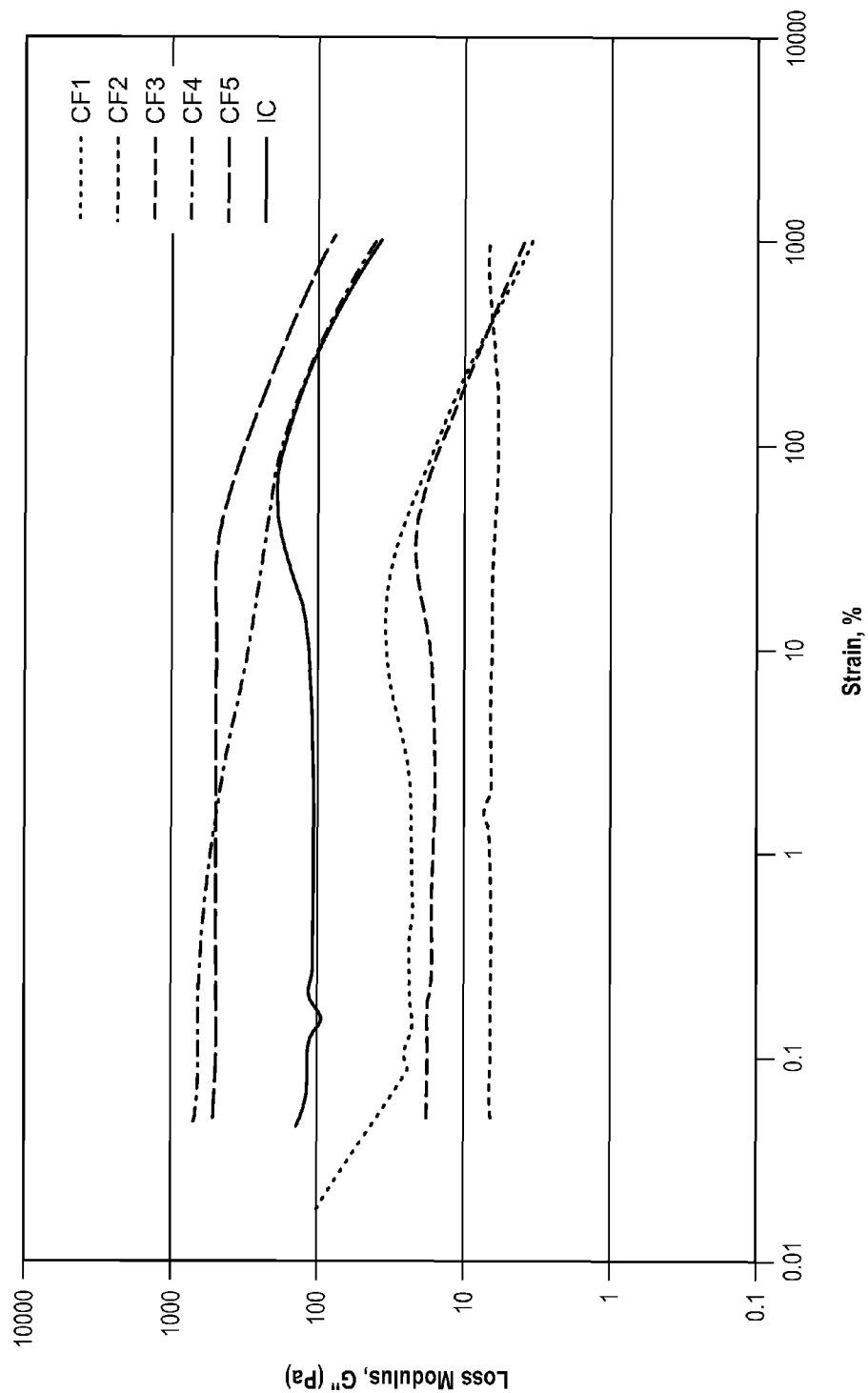
Figure 3D:
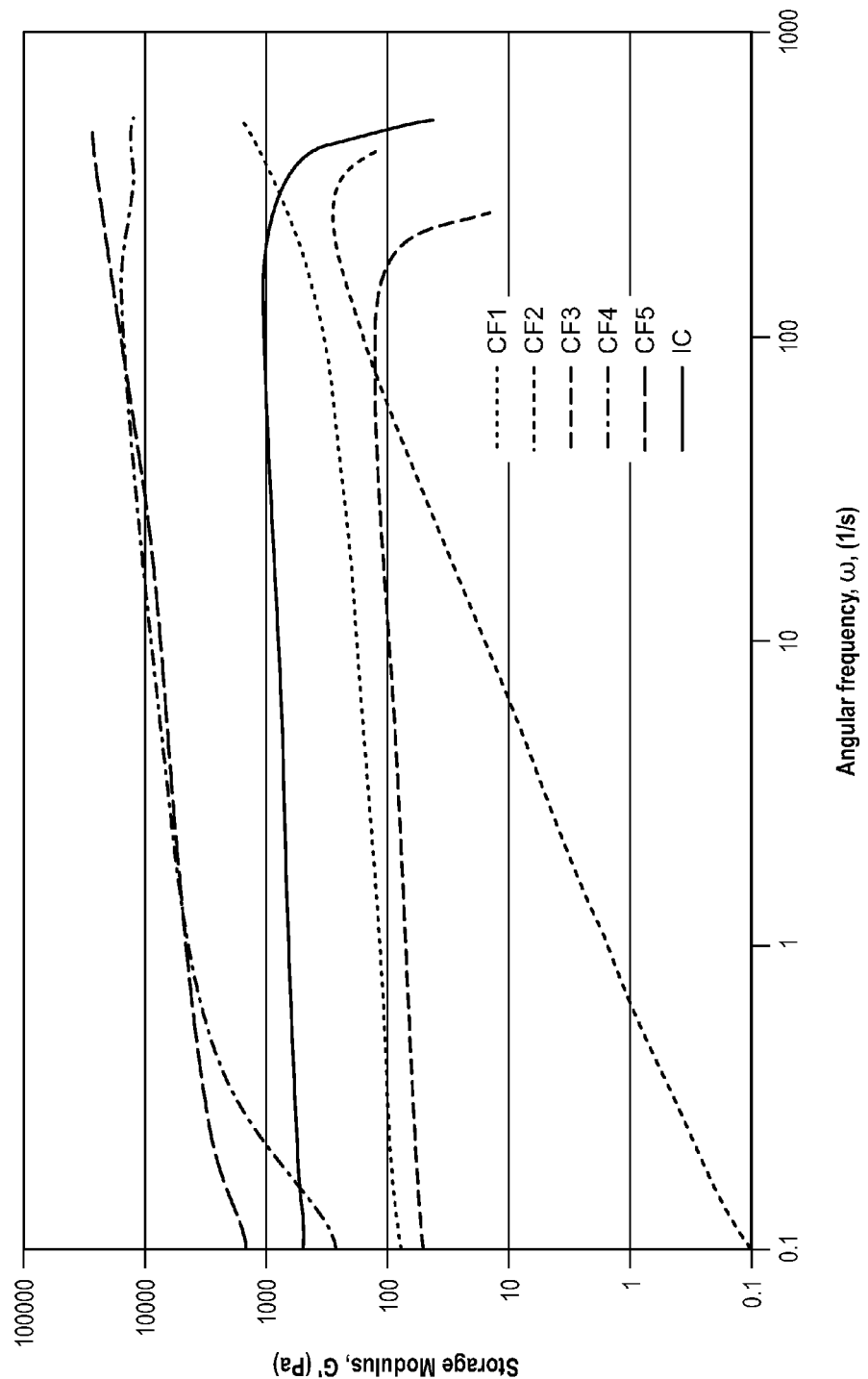
Figure 3E:
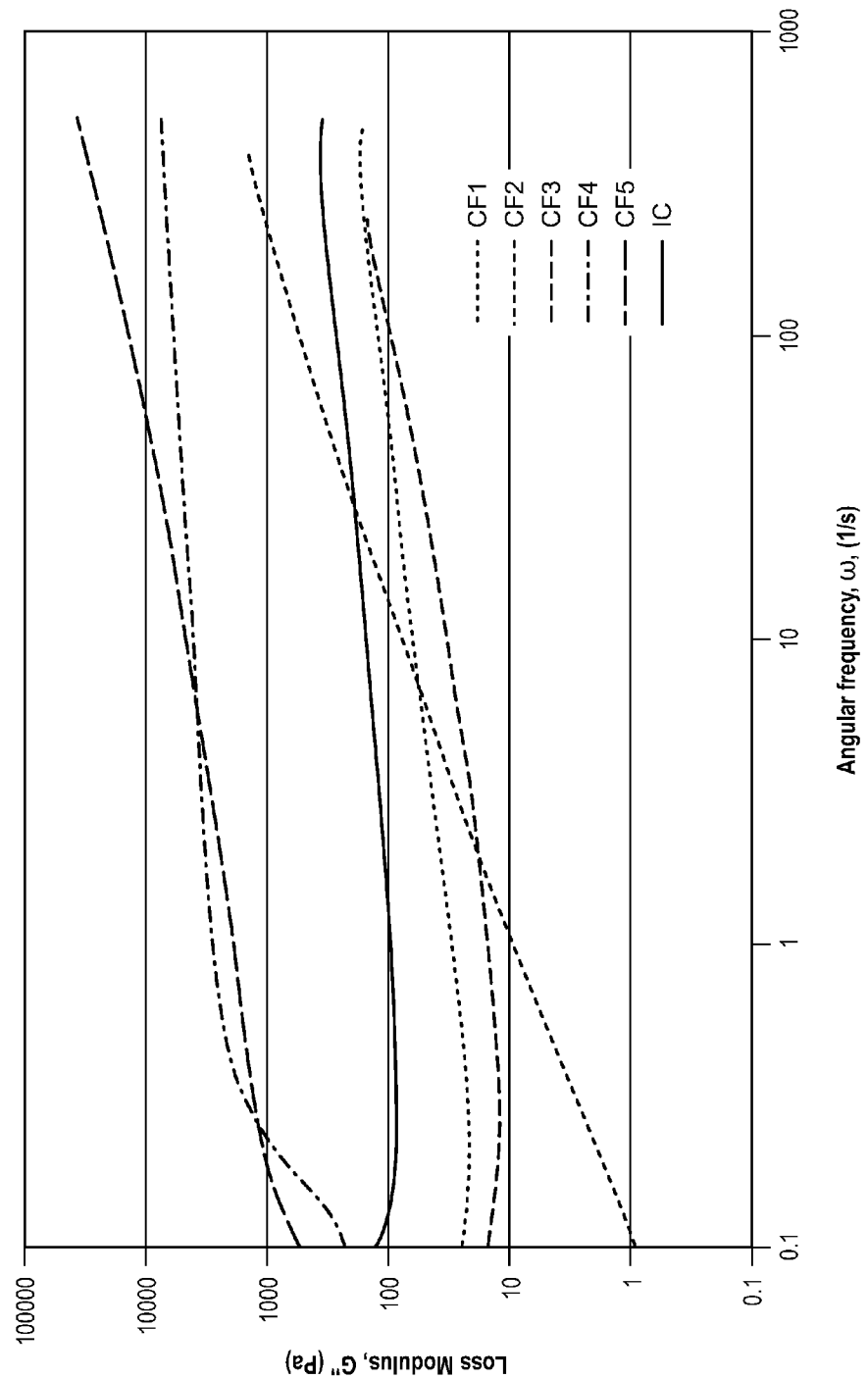

As shown in FIG. 3A, the strain sweep test illustrates that the adhesive composition IC possesses a combination of both high storage modulus and low loss modulus.

As shown in FIGS. 3B-3E, the frequency sweep testing illustrates that the adhesive composition IC has a storage modulus between the highly elastic and very low elastic fluids, while imparting a loss modulus similar to the low viscosity group comparative compostions.

Example 1

Rheological Characterization of the Adhesive Composition

Rheological characterization of adhesive materials was conducted using parallel plate geometry with a 40 mm smooth peltier plate and a 1 mm gap on a TA Instruments G2 Ares Rheometer. Different tests were used to characterize the materials, namely shear rate ramp, shear rate jump, strain sweep, and frequency sweep test.

The shear rate ramp test ramped approximately from 0.2 1/s to 400 1/s and then from 400 1/s to 0.2 1/s. The duration of each ramp was 120 s.

The shear rate jump test held a constant shear rate of 100 1/s for 60 s then jumped to 0.1 1/s for 60 s.

The strain sweep varied the strain from 0.5% to 1000% at an angular velocity of 1 1/s over duration of approximately 450 s.

The frequency sweep varied the frequency from 0.1 1/s to 600 1/s at a strain of 1% over duration of approximately 500 s.

A shear rate ramp varies the shear rate, $\dot{\gamma}$, acting on the material over several orders of magnitude. As the shear rate is changed the resulting shear stress, $\sigma$, is measured. In this case the materials are non-Newtonian and are fitted using the power law model, $$\sigma = K(\dot{\gamma})^n$$

where K is the consistency index and n is the behavior index. It is similar to the Newtonian model, $\sigma = \mu\dot{\gamma}$, when the Newtonian viscosity is defined as $$\mu = K(\dot{\gamma})^{n-1}$$

The consistency index can be thought of in the typical usage of the word consistency, that is a material can have a thick (large K value) or thin (small K value) consistency. The behavior index gives a measure of how shear thinning or thickening a fluid is. If the behavior index is less than 1 then fluid is shear thinning and if greater than 1, shear thickening. The further away from 1 the index is the more prevalent the type of behavior. If the index is 1 then the material is considered Newtonian. When plotting the shear rate vs viscosity on log log graph, the consistency index is the height of the curve and the behavior index is the slope of the curve.

Fluids which are known to have some structure are often subjected to a shear rate jump test. A shear rate jump test is conducted by changing the shear rate by a relatively large amount and noting the response of the fluid. The shear rate ramp and shear rate jump differ in that a ramp gradually changes the shear rate whereas the jump changes the shear rate by several orders of magnitude instantaneously. This test is useful in identifying any hysteresis or thixotropic behavior. Hysteresis occurs when the present viscosity measurement is influenced by the shear rate history of the fluid. Thixotropy occurs when the viscosity changes in time at a constant shear rate.

With respect to viscoelastic fluids, the Maxwell model uses a spring and dashpot in series to describe a viscoelastic fluid, as shown in FIG. 1. A viscoelastic fluid has an elastic response to stress denoted as the storage modulus, G', and a viscous response to stress denoted as the loss modulus, G". Using the spring and dashpot model, the strength of the spring or the viscosity of the fluid can dictate how the system will respond when stressed. For example, if the spring is weak and the viscosity of the fluid is high then when force is applied the spring will easily stretch and the dominant resistance will come from the dashpot moving through the highly viscous fluid. On the other hand, if the fluid has a low viscosity and the spring is very stiff then when force is applied then the dominant resistance will come from the spring. The storage and loss moduli, or elastic and viscous components, are measured using oscillatory rheometry.

A strain sweep varies the amount of strain on the fluid across several orders of magnitude while keeping the angular velocity of the spindle constant. Using the Maxwell model, a strain sweep would be analogous to oscillating the spring to different lengths but at a constant speed. The purpose of performing an oscillatory strain sweep is to identify the linear viscoelastic (LVE) region. Within this region the elastic and viscous components react to the stress applied. Once a specific strain is reached then the storage modulus, or elastic component, begin to decrease in magnitude. Again relating to the example the amount of strain outside the linear viscoelastic region would be like having the spring fully stretched so that there is no longer any elastic response.

A frequency sweep varies the amount of angular velocity, or shear rate, on the fluid while keeping the amount of strain constant. The appropriate amount of strain corresponds to the linear viscoelastic region. There are several pieces of information that can be obtained from a frequency sweep, however, this work only focuses on the magnitude of the storage and loss modulus.

Comparative rheological tests were conducted on the present adhesive composition (IC) formulated in accordance with Table 1 in comparison to several other adhesives and glues such as CF1 (vinyl acetate homopolymer emulsion), CF2 (polyvinyl acetate adhesive), CF3 (pre-mixed polyvinyl acetate and clay adhesive), CF4 (latex-type joint compound), and CF5 (polyurethane adhesive).

The adhesives were analyzed and compared in shear rate ramp, shear rate jump, strain sweep, and frequency sweep tests as described above.

FIG. 2 reports viscosity values measured during the shear rate ramp (left) and shear rate jump (right) for CF1-CF5 in comparison to IC.

FIG. 3A reports data on storage and loss modulus obtained during the strain sweep test. FIGS. 3B-3E report data on storage and loss modulus obtained during the frequency sweep test.

Rheological properties of IC in comparison to CF1-CF5 were then calculated. The behavior index and consistency index were found by fitting the power law equation to the first ramp. The hysteresis area was calculated by taking the area between the down and up ramp. All other values were approximated from graphs of FIGS. 3A-3E. These properties are reported in Table 3 below.

TABLE 3

Rheological Properties Of The Joint Finishing Adhesive (IC)

| Material | Behavior Index, n | Consistency Index, K (Pa s^n) | Hysteresis Area (Pa s/s) | Rapid shear change | LVER Mod G' (Pa) | LVER Mod G" (Pa) | Freq. sweep: G' at 10 Hz (Pa) | Freq. sweep: G" at 10 Hz (Pa) |
|---|---|---|---|---|---|---|---|---|
| CF1 | 0.32 | 13.88 | 77 | N/A | 100 | 20 | 175 | 60 |
| CF2 | 0.91 | 7.3 | 6 | No effect | 1.1 | 8 | 16 | 74 |
| CF3 | 0.43 | 16.14 | 12 | O (1 to 100) | 80 | 20 | 96 | 30 |
| CF4 | 0.25 | 261.32 | −1014 | O (10 to 1000). Longer rebuild | 1000 | 800 | 8800 | 3800 |
| CF5 | 0.25 | 406.92 | 5226 | O (10 to 1000). Very long rebuild | 2000 | 600 | 7900 | 4100 |
| IC | 0.2 | 213.5 | 2530 | 5 to 500. stable recovery | 800 | 100 | 800 | 140 |

The response of IC to a sudden jump in shear rate from 100 1/s to 0.1 1/s was also studied in comparison to CF1-CF5. This data is reported in FIG. 4 where only the viscosity in the range at 0.1-1/s is shown.

Figure 5:
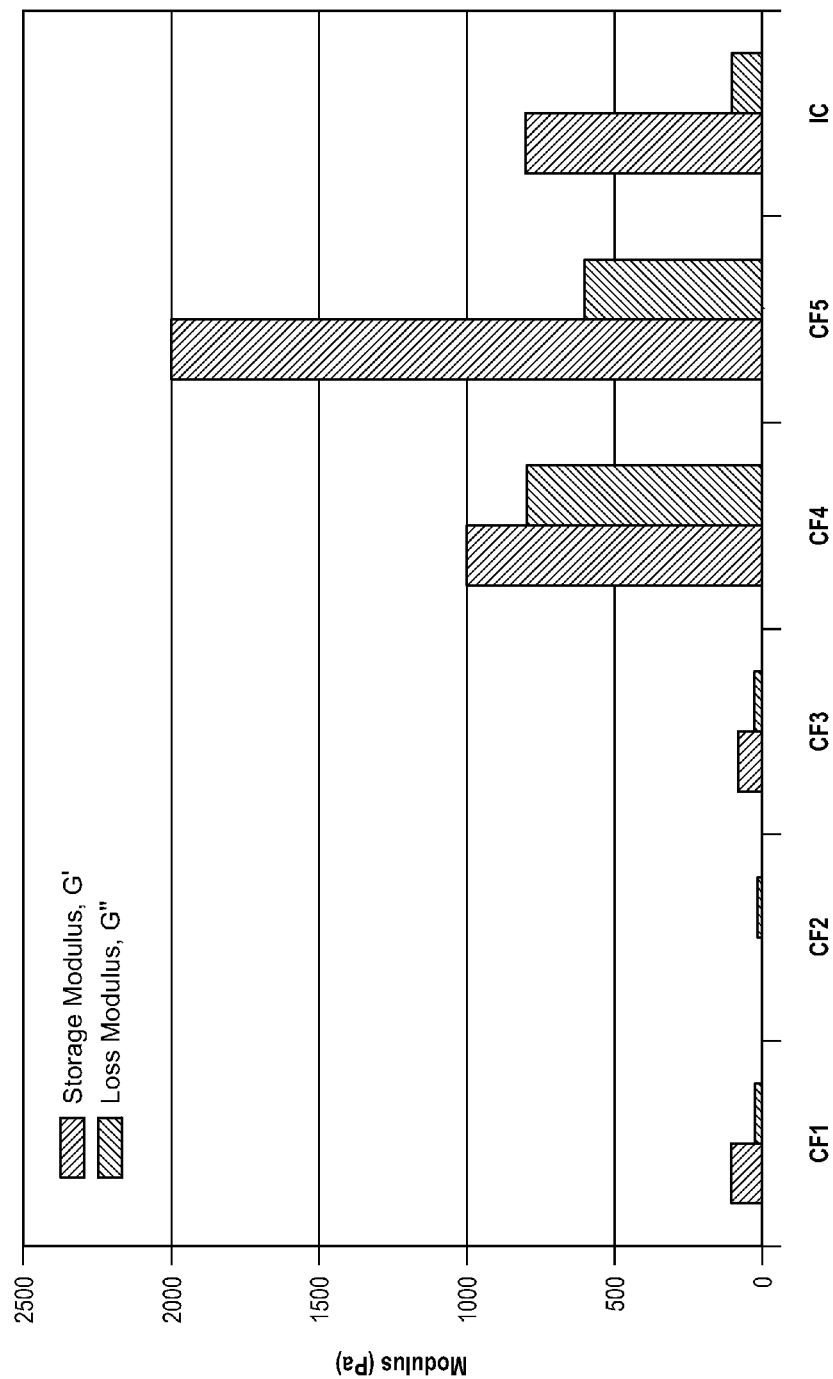
FIG. 5 depicts storage and loss modulus results obtained during the strain sweep test and corresponding to the linear viscoelastic region of Table 3.
Figure 6:
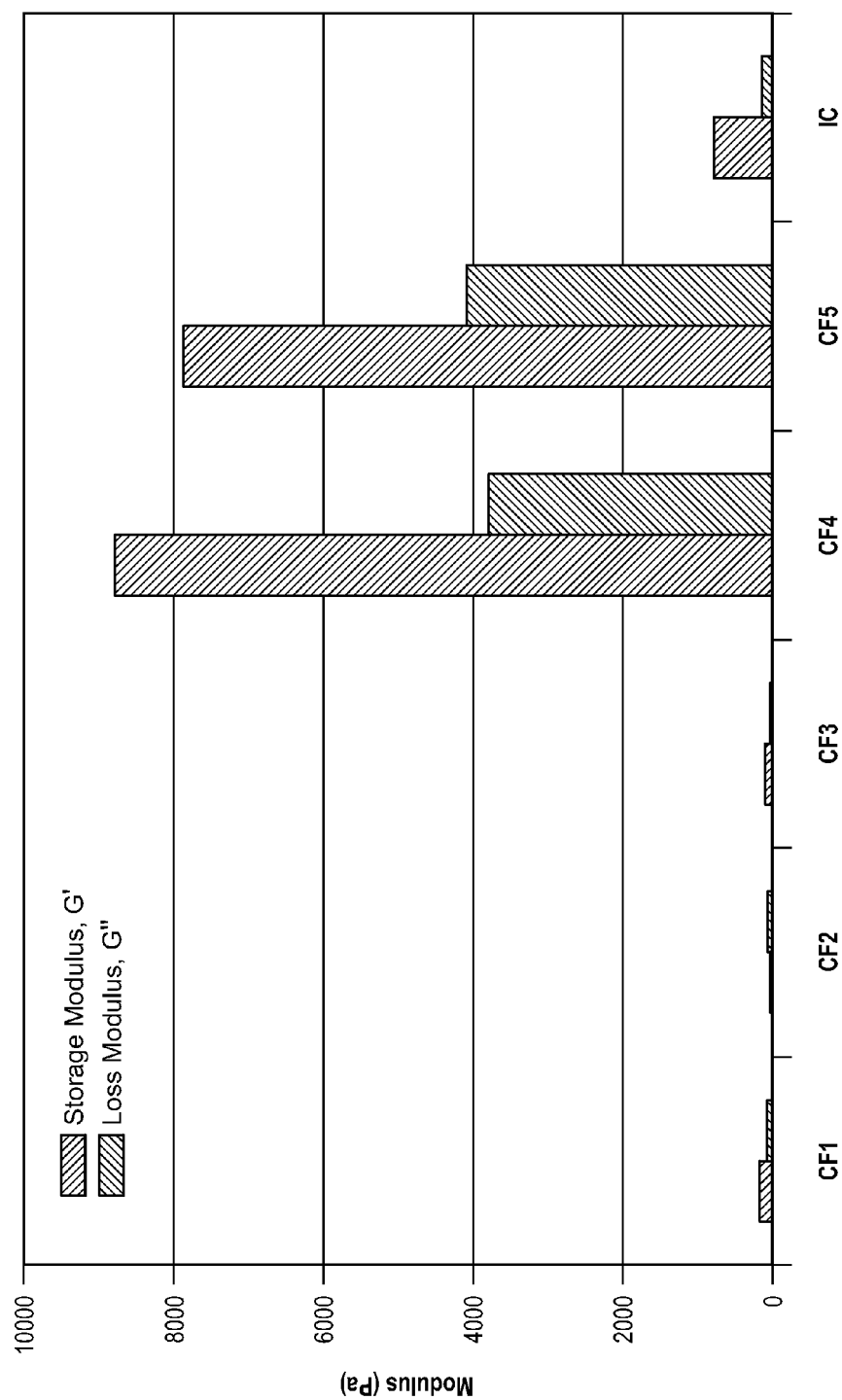
FIG. 6 depicts storage and loss modulus values at 10 Hz collected during the frequency sweep test (Table 3).

FIG. 5 reports storage and loss modulus values collected during the strain sweep test corresponding to the linear viscoelastic region (Table 1), while FIG. 6 reports storage and loss modulus values at 10 Hz collected during the frequency sweep test (Table 1).

The shear rate ramp test shows that IC has a shear thinning behavior comparable with CF4 and CF5 since all three have highly shear thinning behavior and have a consistency index on the order of 100.

Figure 4:
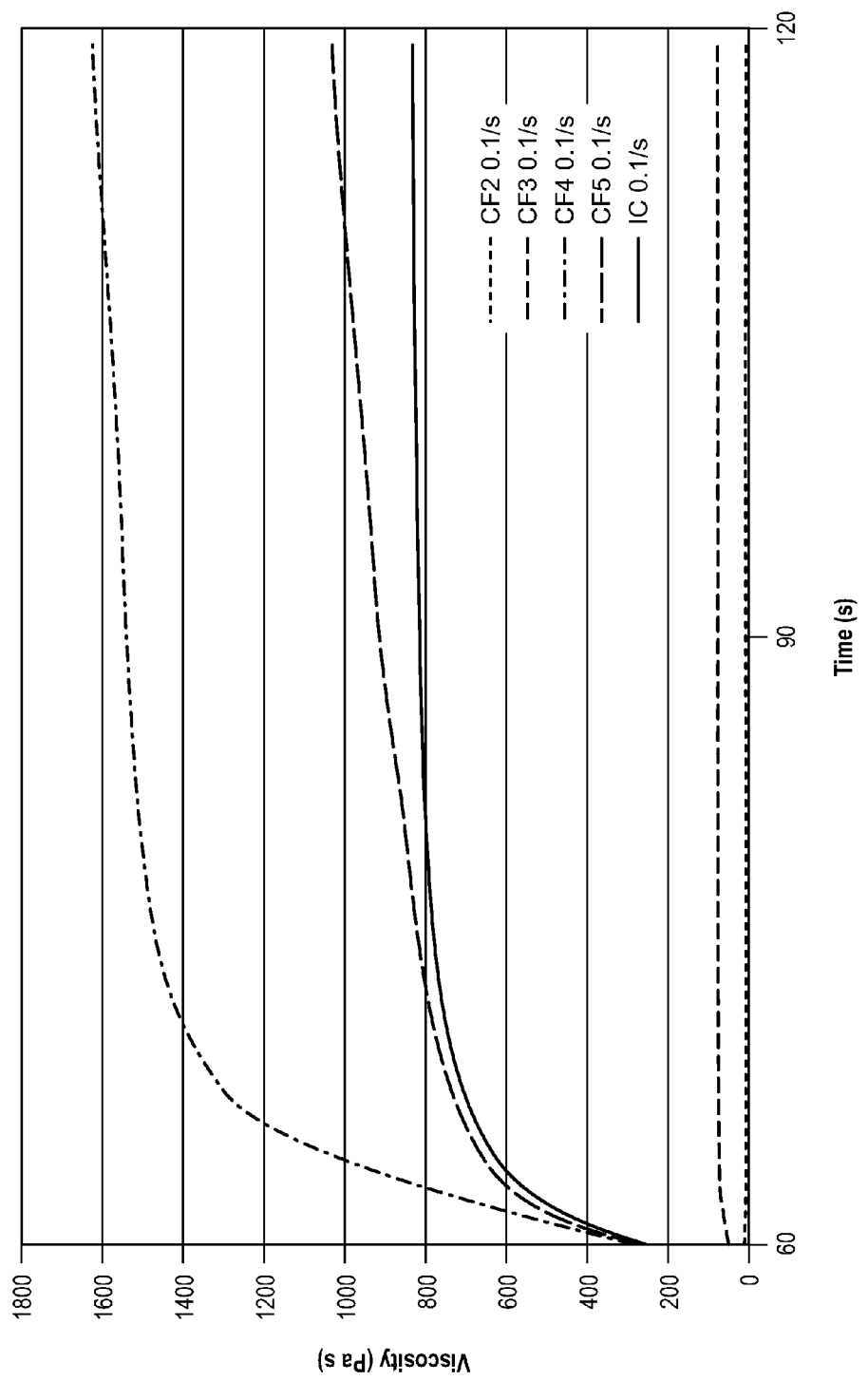
FIG. 4 depicts response results of various adhesives to a sudden jump in shear rate from 100 1/s to 0.1 1/s. Only the viscosity at 0.1 1/s is shown.

However, the shear rate jump test reveals a difference between IC and both CF4 and CF5 by maintaining a steady viscosity within 15 seconds of the rapid change in shear rate. In FIG. 4, CF4 and VF5 show both a response to the rapid change in shear but then also have a continuous increase in viscosity for at least 60 s afterwards. This means that IC recovers its full viscosity much more rapidly than the other two highly viscous adhesives.

The strain sweep test characterizes the materials according to the stress released through elasticity (storage modulus) and viscous dissipation (loss modulus). CF1, CF2, and CF3 (first group) all have low values for both the storage and loss modulus compared to CF4 and CF5 (second group).

However, IC has high storage modulus similar to the second group, but a low loss modulus similar to the first group.

This combination of high storage modulus and low loss modulus makes IC formulation unique and different compared to the other adhesives tested.

The frequency sweep shows that IC has a storage modulus between the highly elastic and very low elastic fluids but has a loss modulus similar to the low viscosity group.

This supports the conclusion that IC has a relatively fast response time to sudden changes in shear rate as well as has a unique combination of a high storage modulus and a low loss modulus.

What is claimed is:

1. An adhesive composition comprising a polymeric binder, filler, rheological modifier and associative thickener, wherein the binder is a combination of Polyvinyl Acetate with Polyvinyl Alcohol in an amount from 10% to 40% by weight, the filler is a combination of attapulgite clay in an amount from 0.5% to 1.5% by weight and kaolin clay in an amount from 5% to 15% by weight, the rheological modifier is at least one hydroxyethyl cellulose based rheological modifier in an amount from 0.01% to 20% by weight, the associative thickener is at least one polyacrylate based associative thickener and used in an amount from 0.01% to 20% by weight, and wherein the composition further comprises a surfactant in an amount from 0.01% to 1% and a defoamer in an amount from 0.01% to 1%; wherein the composition has a viscosity in the range from 100 to 200 Brabender Units and density in the range from 7.5 lbs/gal to 10 lbs/gal.

2. The composition of claim 1, wherein the surfactant has a hydrophilic-lipophilic balance (HLB) from 3 to 20.

3. The composition of claim 1, wherein the pH of the composition is adjusted to be in the range from 7.0 to 12.

4. The composition of claim 1, wherein the composition further comprises a compound selected from the group consisting of a coloring agent, foaming agent, defoaming agent, buffering agent, anti-sedimentation agent, wetting agent, plasticizer, and any combination thereof.

5. A method for assembling a wall, the method comprising:
   installing at least one framing member;
   hanging two gypsum boards such as the two gypsum boards abut on at least one side and create a joint seam between the abutting two gypsum boards;

coating the joint seam with the adhesive composition of claim 1; and applying at least one of a joint reinforcement tape and reinforcement trim over the joint seam coated with the adhesive.

6. The method of claim 5, wherein the adhesive composition is also applied to the framing member.

7. The method of claim 5, wherein the method is repeated as many times as needed to install as many gypsum boards as needed to create a wall of the predetermined size and shape.

8. The method of claim 5, wherein adhesive composition is applied to coat the back side of at least one of the joint reinforcement tape and reinforcement trim, at least one of the joint reinforcement tape and reinforcement trim is then placed over and bonded to the joint seam.

9. The method of claim 5, which further comprises applying at least one coat of a joint compound composition over the joint tape.

\* \* \* \* \*